United States Patent
Zeng et al.

(10) Patent No.: US 11,061,438 B2
(45) Date of Patent: Jul. 13, 2021

(54) FLEXIBLE DISPLAY PANEL, MANUFACTURING METHOD THEREOF AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu (CN)

(72) Inventors: Mu Zeng, Beijing (CN); Tao Wang, Beijing (CN); Zhouping Wang, Beijing (CN); Guowen Yang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 534 days.

(21) Appl. No.: 15/764,347

(22) PCT Filed: Jul. 18, 2017

(86) PCT No.: PCT/CN2017/093365
§ 371 (c)(1),
(2) Date: Mar. 29, 2018

(87) PCT Pub. No.: WO2018/072502
PCT Pub. Date: Apr. 26, 2018

(65) Prior Publication Data
US 2020/0285280 A1   Sep. 10, 2020

(30) Foreign Application Priority Data

Oct. 20, 2016 (CN) .......................... 201610913964.4

(51) Int. Cl.
*G06F 1/16* (2006.01)
*G06F 3/041* (2006.01)

(52) U.S. Cl.
CPC .......... *G06F 1/1652* (2013.01); *G06F 3/0412* (2013.01); *G06F 2203/04102* (2013.01); *G06F 2203/04103* (2013.01)

(58) Field of Classification Search
CPC ................. G06F 1/1652; G06F 3/0412; G06F 2203/04103; G06F 2203/04102
See application file for complete search history.

(56) References Cited

U.S. PATENT DOCUMENTS 9,201,531 B2   12/2015   Hsieh et al.
9,372,559 B2   6/2016    Kim
(Continued)

FOREIGN PATENT DOCUMENTS

CN   103163702 A   6/2013
CN   103309499 A   9/2013
(Continued)

OTHER PUBLICATIONS

International Search Report to corresponding PCT patent application No. PCT/CN2017/093365, dated Sep. 29, 2017.

*Primary Examiner* — Andrew Sasinowski
(74) *Attorney, Agent, or Firm* — Calfee, Halter & Griswold LLP

(57) ABSTRACT

A flexible display panel includes a flexible substrate with a display region and an electrode bonding region. The flexible substrate includes a display surface and a non-display surface opposite to the display surface. Wherein the flexible substrate at a position corresponding to the electrode bonding region is bent along a direction from the display surface to the non-display surface.

13 Claims, 4 Drawing Sheets

(56) References Cited

U.S. PATENT DOCUMENTS

| | | | |
|---|---|---|---|
| 9,419,065 B2 | 8/2016 | Degner et al. | |
| 9,480,174 B2 | 10/2016 | Park | |
| 9,535,294 B2 | 1/2017 | Lou et al. | |
| 9,618,817 B2 | 4/2017 | Jang et al. | |
| 2013/0148072 A1 | 6/2013 | Jang et al. | |
| 2013/0241855 A1 | 9/2013 | Kim | |
| 2014/0042406 A1 | 2/2014 | Degner et al. | |
| 2014/0104762 A1 | 4/2014 | Park | |
| 2014/0184057 A1 | 7/2014 | Kim et al. | |
| 2015/0160749 A1 | 6/2015 | Hsieh et al. | |
| 2015/0261259 A1* | 9/2015 | Endo | G02F 1/13338 |
| | | | 361/679.06 |
| 2015/0310776 A1* | 10/2015 | Lee | G06F 3/041 |
| | | | 345/173 |
| 2016/0187686 A1 | 6/2016 | Lou et al. | |
| 2016/0275830 A1* | 9/2016 | You | G02F 1/133305 |
| 2016/0299592 A1 | 10/2016 | Kim | |
| 2016/0306462 A1* | 10/2016 | Park | G06F 3/04164 |
| 2016/0313846 A1* | 10/2016 | Hong | G06F 3/0412 |
| 2017/0076687 A1 | 3/2017 | Lou et al. | |
| 2019/0245156 A1* | 8/2019 | Kwon | H01L 51/5234 |
| 2019/0278411 A1* | 9/2019 | Jeon | G02B 5/3025 |

FOREIGN PATENT DOCUMENTS

| | | |
|---|---|---|
| CN | 103885631 A | 6/2014 |
| CN | 104503122 A | 4/2015 |
| CN | 104521331 A | 4/2015 |
| CN | 105989783 A | 10/2016 |
| CN | 106383555 A | 2/2017 |
| EP | 2639677 A2 | 9/2013 |
| EP | 2730991 A1 | 5/2014 |
| EP | 2936949 B1 | 10/2017 |
| WO | 2014025534 A1 | 2/2014 |
| WO | 2014107292 A1 | 7/2014 |

\* cited by examiner

FLEXIBLE DISPLAY PANEL, MANUFACTURING METHOD THEREOF AND DISPLAY DEVICE

CROSS-REFERENCES TO RELATED APPLICATIONS

The present disclosure is based on International Application No. PCT/CN2017/093365, filed on Jul. 18, 2017, which is based upon and claims priority to Chinese Patent Application No. CN201610913964.4, titled "a flexible display panel, a method for manufacturing the same, and a display device", and filed on Oct. 20, 2016, and the entire contents thereof are incorporated herein by reference.

TECHNICAL FIELD

The present disclosure relates to the field of display technology, and more particularly, to a flexible display panel, a method for manufacturing the same, and a display device.

BACKGROUND

Flexible display technology has been rapidly developed in recent years, thereby bringing great improvement of a flexible display device in terms of a size of a screen and display quality. Compared with an ordinary rigid display device, the flexible display device has many advantages such as impact resistance, strong shock resistance, light weight, small volume, being easy to carry, low cost and the like.

Currently, a method for manufacturing the flexible display panel includes coating polyimide (PI) solution on a glass substrate, curing and drying to form a flexible substrate, and then sequentially performing a thin film transistor (TFT) process, an electro luminescent (EL) process, a thin film encapsulation process, a laser lift-off technique (LLO) process and a module process on the flexible substrate.

At present, flexible products are also widely applied to the field of touch control. Touch control in a flexible touch control display panel usually adopts a plug-in design manner. An electrode of the flexible touch control display panel is usually bound by an external flexible driving circuit (Chip On Flexible Printed Circuit, COF). In the prior art, the electrode bonding regions of both the flexible display panel and the flexible touch control display panel are large, and the electrode bonding region cannot achieve a narrow border.

SUMMARY

According to an aspect of the present disclosure, a flexible display panel includes a flexible substrate with a display region and an electrode bonding region. The flexible substrate includes a display surface and a non-display surface opposite to the display surface. Wherein the flexible substrate at a position corresponding to the electrode bonding region is bent along a direction from the display surface to the non-display surface.

According to another aspect of the present disclosure, a display device includes the present flexible display panel.

According to another aspect of the present disclosure, a method for manufacturing a flexible display panel, the flexible display panel includes a flexible substrate with a display region and an electrode bonding region, the flexible substrate comprising a display surface and a non-display surface opposite to the display surface, wherein the method includes:

bending the flexible substrate at a position corresponding to the electrode bonding region in a direction from the display surface to the non-display surface.

DETAILED DESCRIPTION

Figure 1:
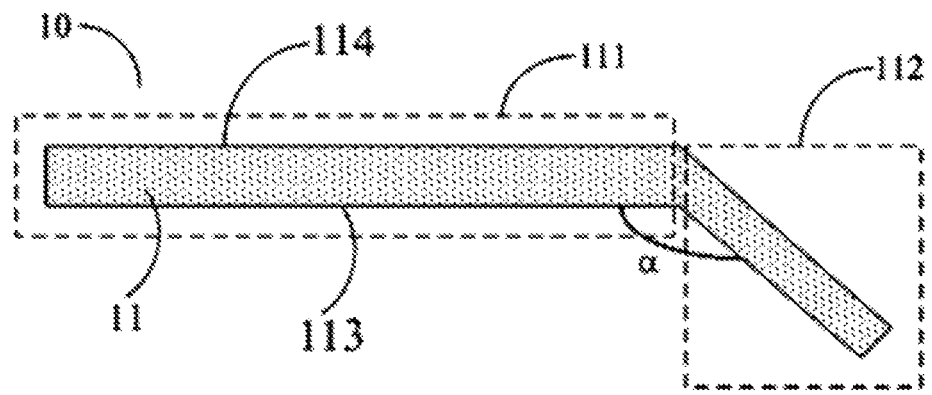
FIG. 1 is a schematic structural diagram of a flexible display panel provided by an embodiment of the present disclosure.

The embodiments of the present disclosure provide a flexible display panel, a method for manufacturing the same and a display device, to achieve a narrow border of an electrode bonding region of the flexible display panel.

To make the objectives, technical solutions, and advantages of the present disclosure clearer, the present disclosure will be further described in detail below with reference to the accompanying drawings. Apparently, the described embodiments are merely a part but not all of the embodiments of the present disclosure. All other embodiments obtained by those skilled in the art based on the embodiments of the present disclosure without creative labor belong to the protection scope of the present disclosure.

The flexible display panel and the method for manufacturing the same provided by specific embodiments of the present disclosure are described in detail below with reference to the accompanying drawings.

The thickness, area size and shape of each layer in the drawings do not reflect the true proportions of the layers, which are merely intended to illustrate the contents of the present disclosure.

As shown in FIG. 1, an embodiment of the present disclosure provides a flexible display panel 10, including a flexible substrate 11 with a display region 111 and an electrode bonding region 112. The flexible substrate 11 has a display surface 114 and a non-display surface 113 opposite to the display surface 114. Wherein the flexible substrate 11 at a position corresponding to the electrode bonding region 112 is bent along a direction away from a display surface, that is, from the display surface 114 to the non-display surface 113. In a specific embodiment of the present disclosure, the display surface of the flexible display panel 10 is a light-emitting surface.

Specifically, as shown in FIG. 1, in a specific embodiment of the present disclosure, the flexible substrate 11 at the position corresponding to the electrode bonding region 112 is bent along a side away from the display surface. The space occupied by the flexible substrate 11 at the position corresponding to the electrode bonding region 112 in the horizontal direction after the flexible substrate 11 is bent is smaller than the space occupied before the flexible substrate 11 is bent. Therefore, the specific embodiment of the present disclosure may achieve a narrow border of an electrode bonding region of the flexible display panel.

In addition, in the specific embodiment of the present disclosure, remaining three sides of the flexible display panel except for the electrode bonding region may achieve narrow borders by means of high-precision attachment or laser cutting. The specific implementation of narrow borders of the three sides is similar to the prior art, which will not be repeated herein. Therefore, compared with the prior art, the flexible display panel in the specific embodiment of the present disclosure may achieve the effect of narrow borders of all sides.

In the specific embodiment of the present disclosure, the flexible display panel is, for example, a planar display panel. Preferably, in the specific embodiment of the present disclosure, an orthogonal projection region of the flexible substrate 11 at the position corresponding to the electrode bonding region on the flexible substrate 11 at a position corresponding to the display region has an overlapped region with the display region. In this way, the narrow border of the electrode bonding region of the flexible display panel may be further achieved.

Figure 2:
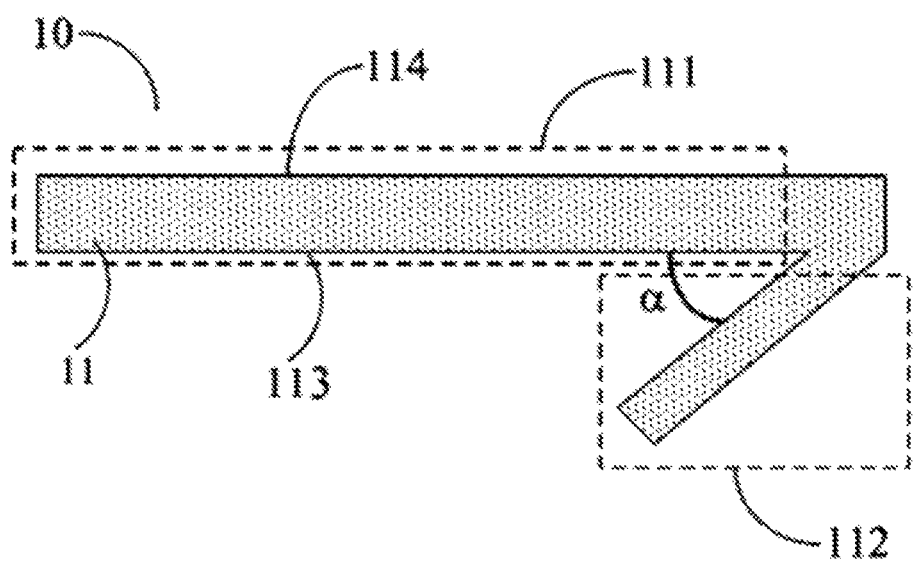
FIG. 2 is another schematic structural diagram of a flexible display panel provided by an embodiment of the present disclosure.

Specifically, as shown in FIG. 2, in the specific embodiment of the present disclosure, an orthogonal projection region of the flexible substrate 11 at the position corresponding to the electrode bonding region 112 on the flexible substrate 11 at a position corresponding to the display region 111 has an overlapped region with the display region 111. That is, in the specific embodiment of the present disclosure, the orthogonal projection region of a portion of the flexible substrate 11 which is bent on the horizontal direction has an overlapped region with the display region 111. In this embodiment, in the specific embodiment of the present disclosure, when the flexible substrate 11 at the position corresponding to the electrode bonding region 112 is bent, a bending angle is greater than 90 degrees. That is, the bending angle α as shown in FIG. 2 is an acute angle, which may better achieve a narrow border of an electrode bonding region of the flexible display panel compared with FIG. 1.

Figure 3:
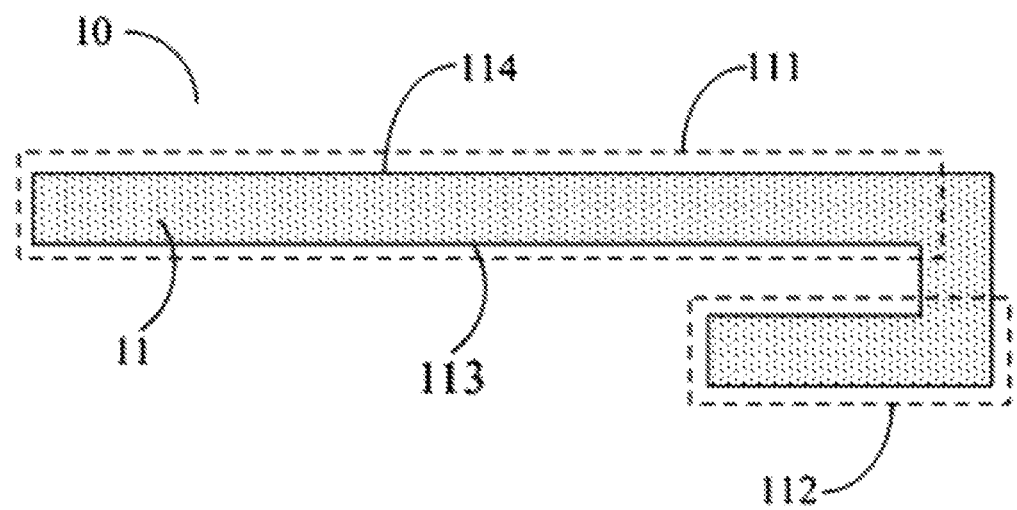
FIG. 3 is yet another schematic structural diagram of a flexible display panel provided by an embodiment of the present disclosure.

Further, in the specific embodiment of the present disclosure, when the flexible substrate 11 at the position corresponding to the electrode bonding region 112 is bent, the bending angle is 180 degrees, as shown in FIG. 3. In this way, in the specific embodiment of the present disclosure, the flexible display panel not only realizes the narrow border of the electrode bonding region in the horizontal direction, but also reduces the space occupied by the flexible display panel in the vertical direction, thereby reducing the overall thickness of the flexible display panel.

Figure 4:
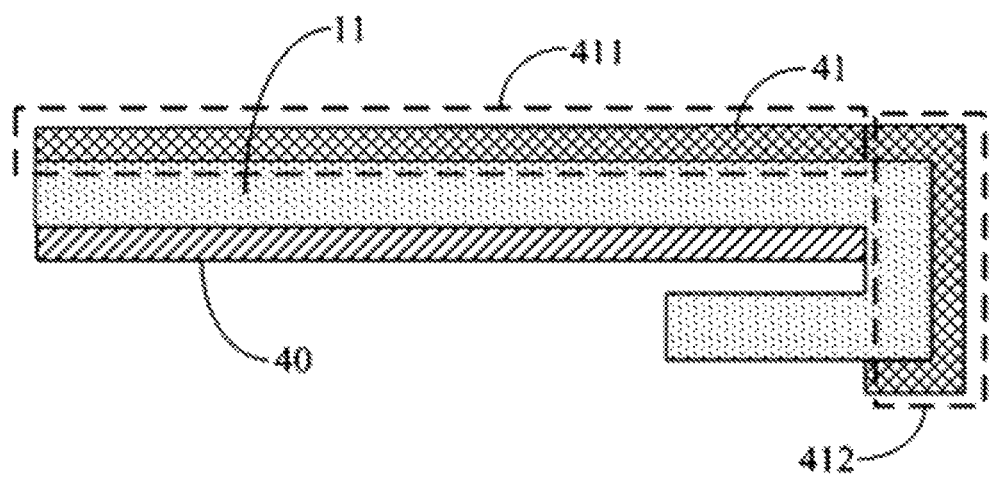
FIG. 4 is a schematic structural diagram of a flexible touch control display panel provided by an embodiment of the present disclosure.

Preferably, as shown in FIG. 4, in the specific embodiment of the present disclosure, a back film 40 attached to the flexible substrate 11 is attached to the non-display surface 113 of the flexible substrate 11 at a position corresponding to the display region. In this way, when the flexible substrate 11 at the position corresponding to the electrode bonding region is bent according to the specific embodiment of the present disclosure, it will not be affected by the thickness of the back film and the hardness of the back film as compared with the prior art where the attached back film 40 covers the entire flexible substrate 11. In an actual production process, the thickness and hardness of the back film are generally designed to be relatively large, and when the back film covers the electrode bonding region of the flexible substrate 11, the bending of the flexible substrate 11 cannot be achieved.

Specifically, as shown in FIG. 4, the flexible display panel 10 in the specific embodiment of the present disclosure further includes a function film 41 provided on a side of the flexible display panel 10 away from the back film 40. The function film 41 includes a first sub-function film 411 and a second sub-function film 412 which are continuous. The first sub-function film 411 is provided on the flexible substrate at the position corresponding to the display region. The second sub-function film 412 is provided on the flexible substrate at the position corresponding to the electrode bonding region. In the specific embodiment of the present disclosure, the function film 41 being provided on the flexible substrate 11 refers to that the function film 41 is directly or indirectly located on the flexible substrate 11. Other films may also be provided between the function film 41 and the flexible substrate 11.

In specific implementation, the flexible display panel 10 in the specific embodiment of the present disclosure is a flexible touch display panel, and the function film 41 is a touch control film. In the specific embodiment of the present disclosure, the touch control film in the flexible touch control display panel may be bent together with the flexible touch display panel, so as to achieve a narrow border of the electrode bonding region of the flexible touch display panel.

Specifically, the flexible display panel according to the specific embodiment of the present disclosure includes: a thin film transistor, an electroluminescent layer and a thin film encapsulation layer sequentially provided on a side of the display surface of the flexible substrate 11; a back film 40 provided on a side of the flexible substrate 11 away from the display surface. The electrode bonding region of the flexible display panel is provided with a bonding component driven by the displaying. Further, the flexible display panel in the specific embodiment of the present disclosure further includes a touch film provided on the thin film encapsulation layer and a cover plate provided on the touch control film. A portion of the touch control film is bent along with the bending of the flexible substrate 11. The electrode bonding region of the flexible display panel is further provided with a bonding component of the touch control film.

A specific embodiment of the present disclosure further provides a display device including the above flexible display panels according to the specific embodiments of the present disclosure. The display device may be a liquid crystal panel, a liquid crystal display, a liquid crystal television, an organic light emitting diode (OLED) panel, an OLED display, an OLED television, or an electronic paper.

A specific embodiment of the present disclosure further provides a method for manufacturing a flexible display panel, the flexible display panel including a flexible substrate with a display region and an electrode bonding region, the flexible substrate includes a display surface and a non-display surface opposite to the display surface, wherein the method includes: bending the flexible substrate at a position corresponding to the electrode bonding region in a direction from the display surface to the non-display surface.

Figure 5:
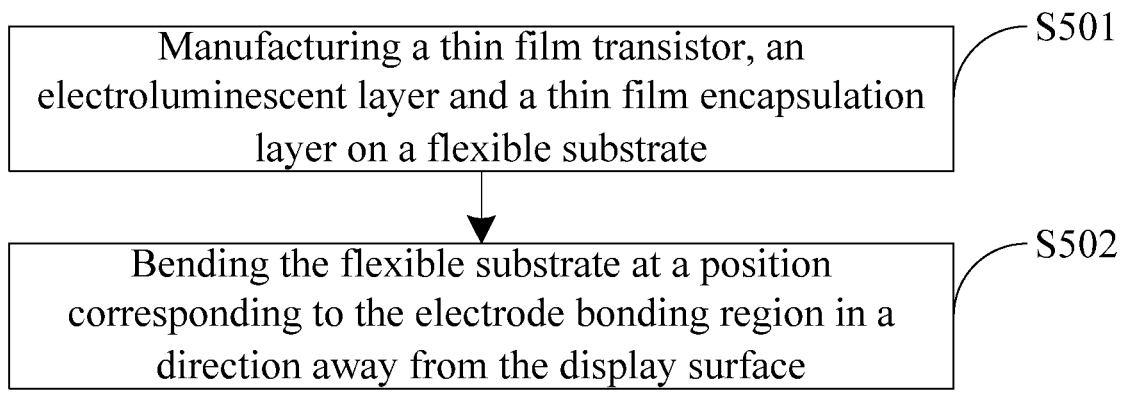
FIG. 5 is a flow chart of a method for manufacturing a flexible touch control display panel provided by an embodiment of the present disclosure.

Specifically, as shown in FIG. 5, the method for manufacturing the flexible display panel according to a specific embodiment of the present disclosure includes following steps.

S501, a thin film transistor, an electroluminescent layer and a thin film encapsulation layer are manufactured on a flexible substrate.

S502, the flexible substrate at a position corresponding to the electrode bonding region is bent in a direction away from the display surface.

During specific implementation, specific methods for manufacturing the thin film transistor, the electroluminescent layer and the thin film encapsulation layer 11 on the flexible substrate according to the specific embodiment of the present disclosure are the same as those in the prior art, which will not be repeated herein.

Specifically, in the specific embodiment of the present disclosure, the flexible substrate at the position corresponding to the electrode bonding region is bent in a direction away from the display surface at a boundary of the display region of the flexible substrate and the electrode bonding region of the flexible substrate.

Preferably, in a specific embodiment of the present disclosure, before a step of the bending, the method further includes: attaching a back film on the non-display surface covering the entire flexible substrate; and removing the back film at a position corresponding to the electrode bonding region. Preferably, the back film at a position corresponding to the electrode bonding region is removed by a laser cutting method.

Alternatively, in a specific embodiment of the present disclosure, before a step of the bending, the method further includes: attaching a back film on a side of the flexible substrate at a position corresponding to the display region away from the display surface. At this time, the flexible substrate at the position corresponding to the electrode bonding region is not covered with the back film, which facilitates the subsequent bending of the flexible substrate at the position corresponding to the electrode bonding region.

Further, in a specific embodiment of the present disclosure, the method further includes manufacturing a function film on a side of the flexible display panel away from the back film. In a specific embodiment of the present disclosure, the function film is, for example, a touch control film. The touch control film includes a first sub-touch control film and a second sub-touch control film. The first sub-touch control film is provided on the flexible substrate at the position corresponding to the display region; and the second sub-touch control film is provided on the flexible substrate at the position corresponding to the electrode bonding region.

The process for manufacturing a flexible touch control display panel according to a specific embodiment of the present disclosure will be described in detail below with reference to the accompanying drawings by using a specific embodiment.

Figure 6:
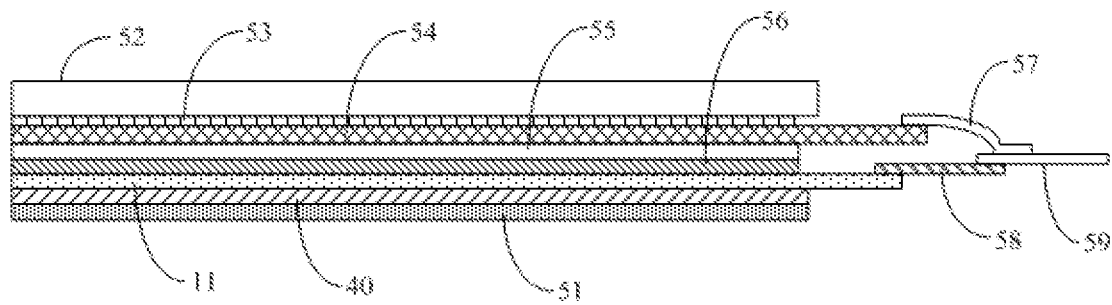
FIG. 6 to FIG. 7 are specific structural diagrams of different stages of the manufacturing process of the flexible touch control display panel provided by embodiments of the present disclosure.

As shown in FIG. 6, after the thin film transistor, the electroluminescent layer and the thin film encapsulation layer are sequentially manufactured on the flexible substrate 11, a back film covering the entire flexible substrate 11 is attached on the non-display surface 113. Then, the back film at a position corresponding to the electrode bonding region is removed by a laser cutting method, to form the back film 40 which is required to be formed when the flexible display panel is formed according to the specific embodiment of the present disclosure. FIG. 6 only shows the schematic diagram of the thin film encapsulation layer 56. Of course, in the actual production process, the back film may also be attached only on the side of the flexible substrate 11 at the position corresponding to the display region away from the display surface after the laser is lifted off, to form the back film 40 only covering the display region of the flexible display panel.

In specific implementation, as shown in FIG. 6, preferably, the length of the back film 40 formed in the specific embodiment of the present disclosure is longer than that of the thin film encapsulation layer 56 in an extending direction from the display region to the electrode bonding region. In this way, it may avoid the phenomenon that the flexible substrate 11 and the thin film encapsulation layer 56 are separated during the subsequent bending. In addition, because the electrode bonding region of the flexible display panel 10 needs to be bent in the specific embodiment of the present disclosure, it is necessary to ensure that the length of the electrode bonding region in an extending direction from the display region to the electrode bonding region of the flexible substrate 11 cannot be designed to be too short in actual design of the electrode bonding region, so as to avoid subsequent bending difficulties, being prone to break or circuit breaking of the electrode bonding region.

Figure 7:
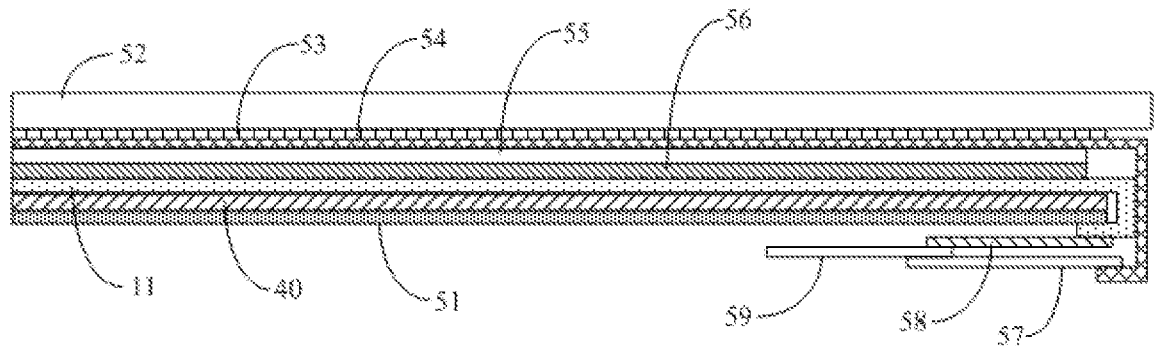

As shown in FIG. 6, a layer of touch control film 54 is manufactured on a side of the flexible display panel away from the back film 40. A length of the touch control film 54 in an extending direction from the display region to the electrode bonding region is longer than that of the cover plate 52 to be fitted later, to facilitate better achieving the bending of the touch control film 54 later. During specific implementation, the touch control film 54 manufactured and formed by the specific embodiment of the present disclosure includes a first sub-touch control film and a second sub-touch control film which are continuous after being bent. The first sub-touch control film 411 is located on the flexible substrate 11 at a position corresponding to the display region. The second sub-touch control film is located on the flexible substrate 11 at a position corresponding to the electrode bonding region, as shown in FIG. 7. In a specific embodiment of the present disclosure, the cover plate 52 is fitted to the touch control film 54 through an optical cement 53. The specific fitting method is the same as that in the prior art, and details are not described herein again. In addition, the method for manufacturing the touch control film 54 in the specific embodiment of the present disclosure is similar to the method for manufacturing the touch control film in an On Cell touch panel in the prior art, and details are not described herein again.

As shown in FIG. 6, a chip on film (COF) 58 is firstly bound to the electrode bonding region of the flexible substrate 11, and then a flexible printed circuit (FPC) 59 is bound thereto, then a touch flexible circuit board 57 is bound thereto, and finally the FPC 59 and the touch flexible circuit board 57 are bound together. The specific method of bonding the COF 58 and the specific method of bonding the FPC 59 and the specific method of bonding the touch flexible circuit board 57 in the specific embodiment of the present disclosure are similar to those in the prior art, and details are not described herein again. In addition, in the actual production process, the bonding order of the touch flexible circuit board 57 and the FPC 59 may be changed, and the specific embodiment of the present disclosure does not limit to the bonding order of the COF 58, the FPC 59 and the touch flexible circuit board 57.

As shown in FIG. 6, a polarizer 55 is attached to the thin film encapsulation layer 56. The attaching of the polarizer 55 may be completed before the COF 58 is bound, or after the touch flexible circuit board 57 and the FPC 59 are bound. In an actual production process, the polarizer 55 may further be attached on the touch control film 54. FIG. 6 only illustrates that the polarizer 55 is attached under the touch control film 54. The specific process of attaching the polarizer is same as that of the same prior art, which will not be repeated herein. Subsequently, relevant films such as a heat-insulating film 51 and the like are further attached in the specific embodiment of the present disclosure. The attaching process of the related films is the same as that of the prior art, and details are not described herein again.

Finally, as shown in FIG. 7, the flexible touch control display panel formed in FIG. 6 is bent at a boundary of the display region and the electrode bonding region of the flexible touch display panel. The second sub-touch control film included in the touch control film 54 manufactured according to the specific embodiment of the present disclosure 54 is bent along with the flexible substrate 11, to finally form the flexible touch control display panel according to the specific embodiment of the present disclosure.

The specific implementation when the COF 58, the FPC 59 and the touch flexible circuit board 57 are bound in the electrode bonding region in the specific embodiment of the present disclosure will be described in detail below with reference to the accompanying drawings.

Figure 8:
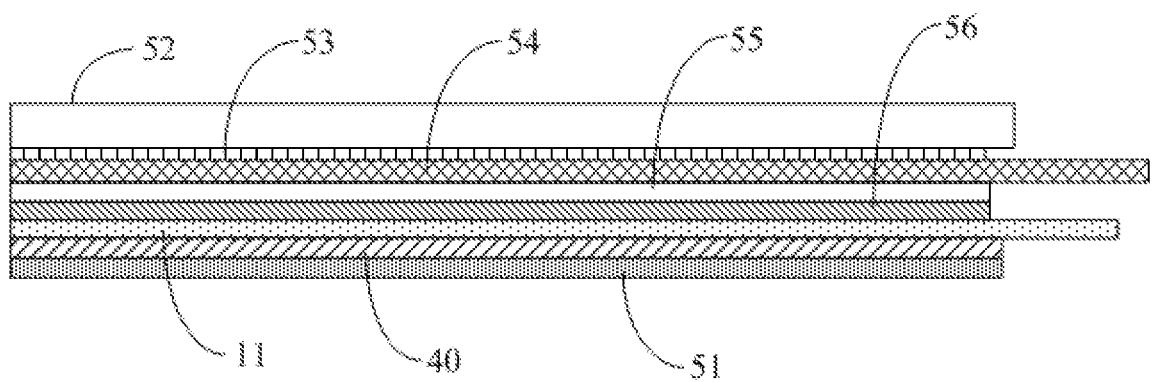
FIG. 8 is a schematic structural diagram of a first implementation when a chip on film, a flexible printed circuit and a touch flexible printed circuit are bound in an electrode bonding region provided by an embodiment of the present disclosure.

The First Implementation:

As shown in FIG. 8, in the specific embodiment of the present disclosure, before the COF film 58, the FPC 59 and the touch flexible circuit board 57 are bound in the electrode bonding region, a layer of touch control film 54 is manufactured on a side of the flexible display panel away from the back film 40. Then, as shown in FIG. 6, the COF 58 is bound, followed by the bonding of the FPC 59, and then the bonding of the touch flexible circuit board 57. Finally, the touch flexible circuit board 57 and the FPC 59 are bound together. The specific method of bonding the COF 58, the FPC 59 and the touch flexible circuit board 57 according to the specific embodiment of the present disclosure is the same as that in the prior art, which will not be repeated herein. That is, in the First implementation of the specific embodiment of the present disclosure, the touch control film 54 is fitted to the flexible display panel firstly, and then the bonding of the COF 58, the FPC 59 and the touch flexible circuit board 57 is performed.

Figure 9A:
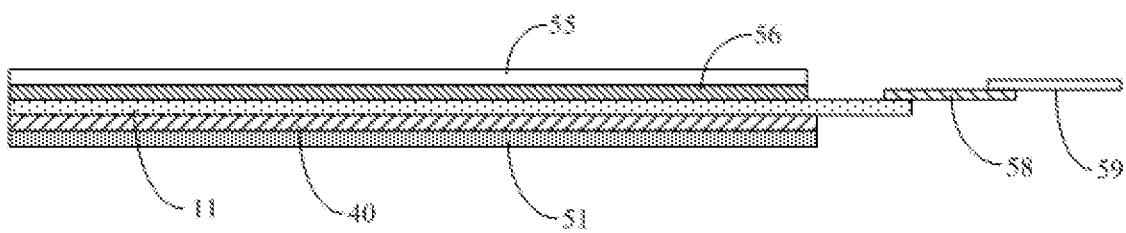
FIG. 9A and FIG. 9B are schematic structural diagrams of a second implementation when a chip on film, a flexible printed circuit and a touch flexible printed circuit are bound in an electrode bonding region provided by an embodiment of the present disclosure.
Figure 9B:
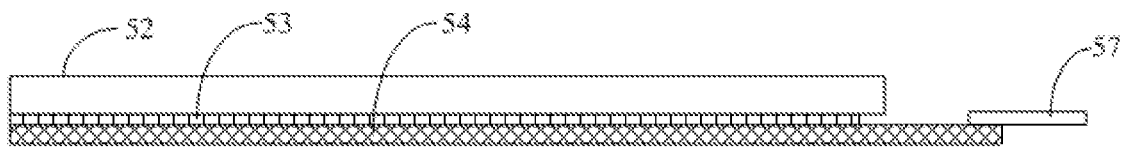

The Second Implementation:

Firstly, in the specific embodiment of the present disclosure, the COF 58 and the FPC 59 are respectively bound to the electrode bonding region of the flexible substrate 11, as shown in FIG. 9A. The touch flexible circuit board 57 is bound to the bonding region of the touch control film 54, as shown in FIG. 9B. Next, in the specific embodiment of the present disclosure, the flexible substrate 11 bound with the COF 58 and the FPC 59 is fitted with the touch control film 54 bound with the touch flexible circuit board 57, and the COF 58 and the touch flexible circuit board 57 are bound together through a FPC 59, as shown in FIG. 6. That is, in the second implementation of the specific embodiment of the present disclosure, the COF 58 and the FPC 59 required to be bound to the flexible display panel and the touch flexible circuit board 57 required to be bound to the touch control film 54 are bound to respective bond regions, respectively, and then the touch control film 54 is fitted to the flexible display panel.

Above all, the specific embodiment of the present disclosure provides a flexible display panel, including a flexible substrate with a display region and an electrode bonding region, wherein the flexible substrate at a position corresponding to the electrode bonding region is bent along a direction away from a display surface. Since the flexible substrate at the position corresponding to the electrode bonding region in the specific embodiment of the present disclosure is bent along the direction away from the display surface, compared with the case where the electrode bonding region and the display region are located in the same horizontal plane in the prior art, the flexible substrate at the position corresponding to the electrode bonding region in the specific embodiment of the present disclosure occupies smaller space in an extending direction from the display region to the electrode bonding region. Therefore, the specific embodiment of the present disclosure may achieve a narrow border of the electrode bonding region of the flexible display panel.

Obviously, those skilled in the art may make various modifications and variations to the present disclosure without departing from the spirit and scope of the present disclosure. In this way, if these modifications and variations of the disclosure belong to the scope of the claims of the present disclosure and the equivalent technologies, the present disclosure is also intended to include these modifications and variations.

What is claimed is:

1. A flexible display panel, comprising a flexible substrate with a display region and an electrode bonding region, the flexible substrate comprising a display surface and a non-display surface opposite to the display surface, wherein the flexible substrate at a position corresponding to the electrode bonding region is bent along a direction from the display surface to the non-display surface;

wherein a back film is attached to the non-display surface of the flexible substrate corresponding to the display region;

wherein a thin film encapsulation layer is provided on the flexible substrate, a length of the back film is greater than that of the thin film encapsulation layer in an extending direction from the display region to the electrode bonding region.

2. The flexible display panel according to claim 1, wherein an orthogonal projection region of the flexible substrate at the position corresponding to the electrode bonding region on the flexible substrate at a position corresponding to the display region has an overlapped region with the display region.

3. The flexible display panel according to claim 2, wherein a bending angle formed between the flexible substrate corresponding to the electrode bonding region and the flexible substrate corresponding to the electrode bonding region is 180 degrees.

4. The flexible display panel according to claim 1, further comprising a function film provided on a side of the flexible display panel away from the back film, the function film comprising a first sub-function film and a second sub-function film, wherein the first sub-function film is provided on the flexible substrate at the position corresponding to the display region; and the second sub-function film is provided on the flexible substrate at the position corresponding to the electrode bonding region.

5. The flexible display panel according to claim 4, wherein the function film is a touch control film.

6. A display device, comprising the flexible display panel according to claim 1.

7. The display device according to claim 6, wherein an orthogonal projection region of the flexible substrate at the position corresponding to the electrode bonding region on the flexible substrate at a position corresponding to the display region has an overlapped region with the display region.

8. The display device according to claim 7, wherein a bending angle formed between the flexible substrate corresponding to the electrode bonding region and the flexible substrate corresponding to the electrode bonding region is 180 degrees.

9. A method for manufacturing a flexible display panel, the flexible display panel comprising a flexible substrate with a display region and an electrode bonding region, the flexible substrate comprising a display surface and a non-display surface opposite to the display surface, wherein the method comprises:

manufacturing a thin film transistor, an electroluminescent layer and a thin film encapsulation layer on the flexible substrate,
 forming a back film on the non-display surface of the flexible substrate at a position corresponding to the display region, wherein a length of the back film is greater than that of the thin film encapsulation layer in an extending direction from the display region to the electrode bonding region;
 bending the flexible substrate at a position corresponding to the electrode bonding region in a direction from the display surface to the non-display surface.

10. The method according to claim 9, wherein the step of bending the flexible substrate at a position corresponding to the electrode bonding region in a direction from the display surface to the non-display surface comprises:

bending the flexible substrate at the position corresponding to the electrode bonding region in a direction away from the display surface at a boundary of the display region of the flexible substrate and the electrode bonding region of the flexible substrate.

11. The method according to claim 9, wherein before the step of bending the flexible substrate at a position corresponding to the electrode bonding region in a direction from the display surface to the non-display surface, the method further comprises:

forming a back film on the non-display surface covering the entire flexible substrate; and
 removing the back film at a position corresponding to the electrode bonding region.

12. The method according to claim 11, further comprising manufacturing a function film on a side of the flexible display panel away from the back film, the function film comprising a first sub-function film and a second sub-function film, wherein the first sub-function film is provided on the flexible substrate at the position corresponding to the display region; and
 the second sub-function film is provided on the flexible substrate at the position corresponding to the electrode bonding region.

13. The method according to claim 9, further comprising manufacturing a function film on a side of the flexible display panel away from the back film, the function film comprising a first sub-function film and a second sub-function film, wherein the first sub-function film is provided on the flexible substrate at the position corresponding to the display region; and
 the second sub-function film is provided on the flexible substrate at the position corresponding to the electrode bonding region.

* * * * *